July 29, 1958 S. RIOLE ET AL 2,845,179
PRIMER UNIT FOR WATER FILTERING SYSTEM
Filed Jan. 13, 1956 2 Sheets-Sheet 1
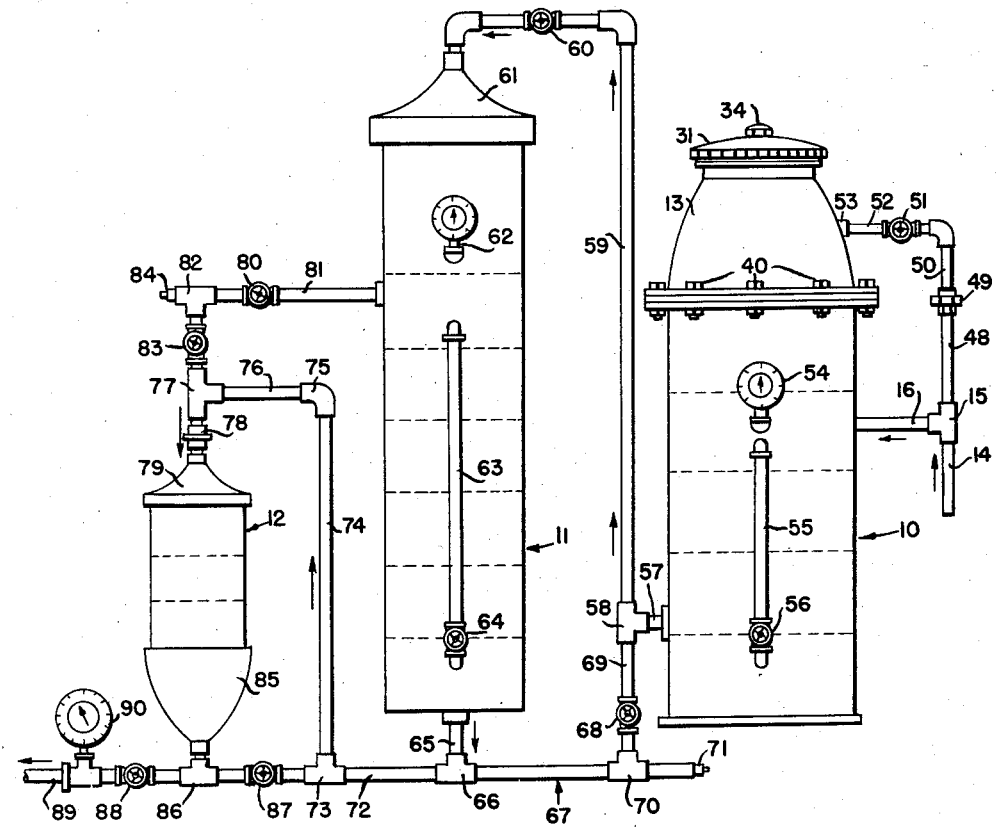
FIG. 1.
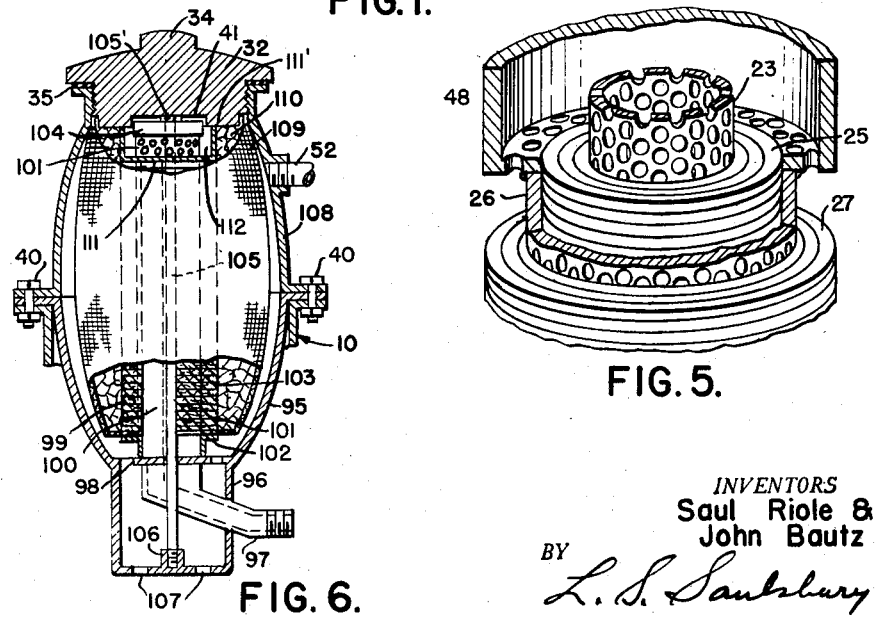
FIG. 5.
FIG. 6.
INVENTORS
Saul Riole &
John Bautz
BY
*L. S. Saulsbury*
ATTORNEY.

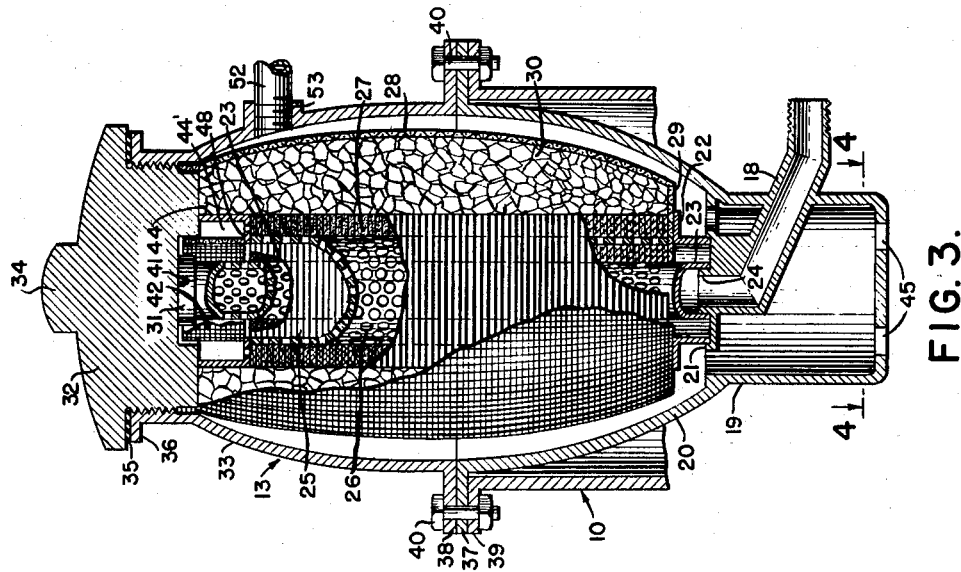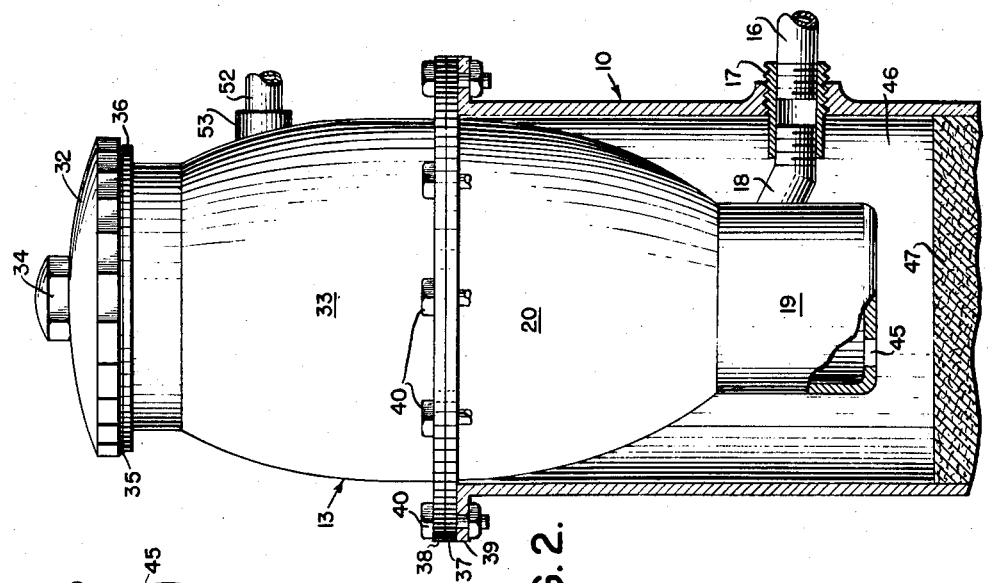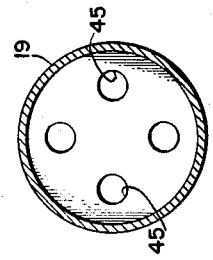

United States Patent Office 2,845,179
Patented July 29, 1958

2,845,179

PRIMER UNIT FOR WATER FILTERING SYSTEM

Saul Riole, Jamaica, N. Y., and John Bautz, Darien, Conn.

Application January 13, 1956, Serial No. 558,940

7 Claims. (Cl. 210—315)

This invention relates to a primer unit for a water filtering system.

It is the principal object of the present invention to provide a water filtering system for home and plant uses which can be generally maintained by the home and plant owners themselves without great labor costs.

It is another object of the invention to provide in a water filtering system having multiple tanks with multiple filtering material therein, a primer unit which first receives the water and which is so designed that it removes the bulk of the foreign matter and softens the water before being admitted to the remainder of the system and which is so shaped and so designed that it can be easily removed as a unit from the top of the first filtering tank wherein the bulk of the filtering material contained in the larger compartments of the multiple tanks will not need to be replaced except over long periods of time, the greater part of the filtering action having been effected by the initial primer unit which is attached to and removed from the upper end of the first tank.

It is a further object of the invention to provide in a primer unit adapted to remove the bulk of the foreign matter an assembly which will withstand the initial water main pressure, which can be bypassed where clean water is being supplied to the system and wherein the filtering elements contained within the units can be secured therein by bolt means as when the water pressure of the main is high and so that the parts may be kept in proper alignment and water hammer or noise avoided by the high pressure.

It is a still further object of the invention to provide in a water filter unit an assembly of cotton covered perforated tubes, wherein cotton yarn is wound about the exterior of the tubes and the tubes interfitted one within the other and adapted to take the initial flow of the water entering the filtering system and which will serve to absorb as much as sixty percent of the vegetable matter and iron running in the water and prevents the passage of this material to the water softening ingredient so that it is saved and wherein the assembly of the two cotton wound tubes at the upper end of the primer unit is such as to provide an air space and an overflow of certain of the water so that a water log in the system is prevented.

Other objects of the invention are to provide a primer unit for a water filtering system adapted to be removably fitted in one end of a filtering tank, having the above objects in mind, which is of simple construction, inexpensive to manufacture, has a minimum number of parts, easy to assembly and maintain, compact, durable and adapted to withstand water pressures, easy for access, efficient and effective in use.

For other objects, and for a better understanding of the invention, reference may be had to the following detail description taken in connection with the accompanying drawing, in which Figure 1 is a vertical elevational view of a water filtering system having the primer unit of the present invention in one of the tanks thereof, Fig. 2 is a vertical elevational view of the primer unit with the tank in which it is incorporated being cut away to show the primer unit, Fig. 3 is a vertical sectional view of the primer unit with portions of the internal parts broken away to show the interior construction of the unit, Fig. 4 is a transverse sectional view taken on line 4—4 of Fig. 3 and looking through the discharge end of the primer unit, Fig. 5 is an enlarged fragmentary perspective view of the upper end of the interfitted cotton covered perforated tubes, and Fig. 6 is a vertical sectional view of a modified form of the primer unit wherein a tie bolt is used for the securing of the internal parts of the primer together and to its housing so that the unit will hold together under high pressures.

Referring now particularly to Fig. 1, there is shown the water filtering system having a plurality of filtering tanks 10, 11 and 12 with which is associated the primer filtering unit 13 of the present invention. This primer unit 13 is mounted in the upper end of the first filtering tank 10. Water is supplied to this primer unit under pressure from a pipe 14 leading to a T-fitting 15 and from which a pipe 16 extends to a nipple fitting 17 threaded into the wall of the tank 10 at one side thereof and which is in turn threaded to an inclined conduit portion 18 on discharge distributing chamber 19 of the bottom half 20 of the primer unit 13. The inclined conduit portion 18 extends through an integral flanged base portion 21 centrally located within the discharge unit 19 and on which there is rested a flanged annular base support 22. Extending upwardly from the flanged base support portion 21 there is an inner tube 23 fitted upon a vertically-extending flange 24 of the conduit portion 18 so that it is held in against lateral displacement at its lower end. This tube 23 is perforated and is wound with multiple turns of cotton filtering yarn 25 as best shown in Figs. 3 and 5. This cotton yarn 25 is wound thereon very tightly and will serve as the first filtering material to receive the water entering the system and will absorb and filter vegetable matter, iron rust and other minerals entering the system with the water. The water moves rapidly upwardly under pressure through the inner tube 23 and passes laterally outwardly through the cotton and through an outer perforated tube 26 which is similarly covered and wound tightly with cotton yarn 27 so that the water will be subjected to a double sleeve of cotton yarn. It is found that this cotton alone will absorb as much as sixty percent of the vegetable matter and iron that passes through the system with the water. Upon the water going through the second tube and its cotton, it passes to an annular chamber of the same height as the tubes and retained by a wire mesh basket 28 having its bottom 29 resting upon the annular flanged base 22 and filled with water softening material 30. The inner tube 30 extends through the bottom 29 of the mesh basket while the outer tube 26 has its lower end resting on the bottom 29 thereof.

In order to prevent water log of the water passing through this primer the upper end of the perforated inner tube 23 is left free of turns of the cotton yarn as shown in Figs. 3 and 5, and has a closure cap 31 that is engaged by a large screw down cover 32 that threads into upper half 33 of the unit 13. A hexagonal top projection 34 can be engaged by a wrench so that the cover 32 may be made tight against a gasket 35 lying over top flange 36 of the primer half 33. The lower half 30 of the unit has an annular top flange 37 that is joined to a bottom flange 38 of the upper half 33 and the two flanges are in turn joined to a top flange 39 of the filter tank 10 by fastening bolts 40. Normally access can be had to the interior of the primer unit 13 through the screw down cover without the halves 20 and 33 of the unit being separated from one another and from the tank 10.

The cover 32 has a recess 41 to receive the cap 31 of the inner tube 23 and also to receive the upper end of a wire mesh sleeve 42 that rests upon a perforated ring 43 that may be welded to the upper end of the outer perforated tube 26 and has a sleeve extension 44 extending upwardly from the outer periphery of the flange portion 43. An annular space 44' free of cotton is thus provided at the upper ends of the tubes and adjacent to the covers into which water can escape upon there becoming a tendency for the unit to water log so that the path of a small portion of the water can escape to the water softening material through the perforated flange 43 and the one cotton layer 27 on the outer tube 26.

It will be seen that the basket 28 is held at its upper end against vertical movement by the cover 32 when it is tightened down upon the extension 44 of the outer tube 26 and the cap 31 of the inner tube 23 so that the assembly is for usual water pressures held against vertical displacement within the primer halves 20 and 33.

The discharge portion 19 depends from the lower half 20 of the tank 10 and the water which has been initially filtered and softened by passage through the mesh basket 28 flows into the discharge portion 19 and is distributed through four openings 45 into a vacuum space 46 in the upper end of the tank 10 and surrounding the lower half 20 of the primer unit 13 and onto filtering material 47 arranged in layers in the lower end of the tank 10 and comprising layers of cotton, activated carbon, pea mesh quartz, and in the lower end of the tank, combined cotton and activated carbon.

If, for any reason the primer unit be clogged or water logged or unusually clean water substantially free of vegetable matter and iron and not needing softening material, the inflow of water from the pipe main 14 and the T-fitting can be directed upwardly through a pipe 48, Fig. 1, a separable coupling 49, pipe 50, past hand valve 51 and inlet pipe 52 connected to an internally threaded boss 53 in the upper half 33 of the primer unit. The water will be directed upon the water softening material and will move downwardly into the bottom distributing chamber 19 of the lower half 20 and be distributed through the openings 45 on to the filtering material 47 in the tank 10.

A pressure gauge 54 is provided on the tank 10 and below this gauge is a glass water gauge 55 through which dirt of the water can be observed and from which by opening valve 56 at the lower end thereof samples of the water can be taken.

The water leaves tank 10 through an outlet pipe 57 and is delivered through a T-fitting 58 and a riser pipe 59 and a valve 60 to a tube head 61 of the second filter tank 11 which is similarly filled with layers, beginning near the upper end thereof, with activated carbon, quartz, cotton and activated carbon, cotton and pea mesh quartz on the bottom of the tank. A top space is provided above the filtering material in the upper end of the tank 11 and the pressure within that space can be determined by a pressure gauge 62. Below this pressure gauge 62 is an elongated water gauge 63 through which the condition of the water can be observed and which has a drain valve 64 at the lower end from which a further sample of the water can be taken. The water passes through the filtering material in this tank 11 and leaves the bottom thereof through an outlet pipe 65 that is connected to a T-fitting 66 of a horizontal line 67. This line 67 may be used to drain the several filter tanks. The tank 10 can be drained by opening valve 68 that is connected by a pipe 69 from the T-fitting of the tank 10 and to a T-fitting 70 in the drain line. By removal of a drain plug 71 at the end of the pipe line 67 water can be removed from the tanks 10 and 11.

From the T-fitting 66 there extends a pipe 72 which is connected to a T-fitting 73 so that with the valve 68 closed and the drain plug 71 in place, the water from the filter tank 11 passes along the horizontal drain line 67 to the T-fitting 73 and upwardly through a riser pipe 74, elbow 75, pipe 76 to T-cutting 77 that is connected through a releasable coupling 78 to top head plate 79 of final filter or polisher tank 12. If it is desired to remove air from the filter tank 11 and from the top of the polisher tank 12, a valve 80 in a pipe line 81 connected to a T-fitting 82, is opened to allow the air to be removed from the top of the filter tank 11 and a valve 83 is opened that connects the T-fitting 77 with the T-fitting 82. Upon the drain plug 84 being removed from the T-fitting 82 the air will be exhausted therefrom. In the tank 12 there is provided a plurality of nylon filter pads and quartz of rice mesh in the bottom thereof. The lower head member 85 of the tank 12 is connected to a T-fitting 86 so that the filtered water leaving this tank can be delivered through drain line 67, upon a valve 87 being closed and a valve 88 opened to water supply line 89 at pressure as indicated by the pressure gauge 90 located thereon.

Where the water supplied to the tanks is of very high pressure, the retaining of the parts by the cover 32 at their upper ends thereof is not adequate to prevent these parts upon vibrating and becoming noisy. Thus, there has been provided a form of the invention as shown in Fig. 6 where further means is used to secure the parts together. According to this form of the invention, the primer unit includes a lower primer half 95 having a discharge bottom end 96 with integral offset conduit 97 extending to integral base support portion 98 at a point offset from the center thereof. Extending upwardly from the conduit 97 is an inner tube 99 that is provided with cotton yarn on the exterior thereof as indicated at 100. Centrally along the base portion is mounted the outer tube 101 that has a flange 102 and surrounding which is cotton yarn 103. This outer tube 101 extends upwardly and has a top clamp cover 104 thereon that bears against the upper ends of the inner and outer tubes 99 and 101 so as to provide a clamp plate through which a long bolt or tie rod 105 extends and against which its head 105' is tightened. This tie rod extends downwardly through the outer tube 101 and through the base portion 98 for threaded clamp tight engagement with an upwardly-extending threaded sleeve portion or boss 106 in the bottom of the discharge portion 96 so as to tightly secure the tubes to the integral base portion 98. The discharge portion 96 has discharge holes 107 through which the water can pass to the filtering material in the tank 10. The primer has an upper part 108. A mesh basket 109 is disposed in the primer parts and supported on the flange 102. This basket contains the water softening material 110. The recess 41 in the cover accommodates the clamp cover 104 and head 105' of the tie bolt 105.

The outer tube 101 is left free of cotton yarn at its upper end and is surrounded by a perforated annular flange 111 having an upwardly-extending wall portion 111' whereby to provide a water relief chamber 112 in the upper end of the unit so as to prevent the unit from becoming water logged. The flange 111 is fixed to the outer tube 101 as by welding and its portion 111' extends upwardly to the cover.

It should now be understood that there has been provided a primer unit which can be secured to the upper end of a water filter tank of a filtering system which is so designed as to assume the major part of the filtering action of water entering such a filtering system and which can be easily disassembled and recharged or cleaned by the owner of the system and wherein the bulk of the filtering material is saved against use so it need not be changed except over a period of long terms. All parts of the unit are preferably made from stainless steel.

While various changes may be made in the detail construction of this invention, it shall be understood that such changes shall be within the spirit and scope of the present invention as defined by the appended claims.

What is claimed is:

1. A primer filter unit for water filtering tanks which comprises an individual housing means for attaching the housing to the upper open end of a filtering tank to provide in effect, a cover therefor, a cover for the upper end of the housing to which access can be had to the interior of the primer unit, conduit means on the lower end of said primer through which water can be directed from the water main thereto, an integral base portion surrounding the conduit means, a vertically-extending perforated tube releasably supported upon said base portion and extending upwardly to and within the cover, and filtering material wound tightly upon said perforated tube, a second perforated tube concentric with the one perforated tube and extending upwardly from said base portion to said cover, filtering material wound tightly upon said perforated second tube, and a mesh basket supported in said unit housing and surrounding said tubes, said mesh basket adapted to contain water softening material, and said tubes and filtering material being removable through the cover opening of the housing as a unit.

2. A primer filter unit for water filtering tanks as defined in claim 1 and said cover being engageable with the upper ends of said tubes and threadable down into said house to fasten the tubes upon said base portion.

3. A primer filter unit for water filtering system as defined in claim 1, and said second perforated tube having a perforated flange extending outwardly thereof and a wall portion extending upwardly from the flange to said cover, said one tube extending upwardly above the flange and to said cover, the upper end of said inner tube being free of filtering material whereby to provide a water relief space at the upper ends of said tubes and prevent a water log, the water entering said space escaping through said perforated flange and only through the filtering material on the second tube upon delivery to the softening material.

4. A primer filter unit for water filtering tanks as defined in claim 1, and said conduit means being offset from the center of the base portion, said one tube being aligned with the conduit means, a clamp cover plate extending over the upper ends of said tubes, a tie rod extending downwardly from said clamp cover plate through the base portion and threaded into the lower end of the housing whereby the tubes will be positively locked to said base portion and adapted to be held against high water pressures.

5. A primer filter unit for water filtering tanks as defined in claim 1, and said housing being formed of a lower part having a discharge portion and a flange at its upper end and an upper part having a flange at its lower end, said flanges being mated and adapted to be held in water tight relationship with one another and adapted to be attached with common bolt means to the end of the filtering tank.

6. A primer filter unit for water filtering tanks as defined in claim 1, and an inlet connection connected to the upper end of said unit housing and adapted to permit alternate delivery of water to the softening materials and without passing directly through the tube filtering materials.

7. A primer filter unit for water filtering tanks as defined in claim 1, and said housing having a discharge portion on the lower end thereof, said inlet conduit means being integral with said discharge portion and projecting outwardly thereof, the outer end of said conduit means being adapted for engagement with a nipple fitting extendable through the filtering tank's wall.

References Cited in the file of this patent

UNITED STATES PATENTS

| | | |
|---|---|---|
| 872,437 | Leonard | Dec. 3, 1907 |
| 2,233,093 | Carmen et al. | Feb. 25, 1941 |
| 2,371,444 | Hubert | Mar. 13, 1945 |
| 2,379,582 | Kracklauer | July 3, 1945 |